No. 803,243. PATENTED OCT. 31, 1905.
J. G. OLIVER.
STOCK HANDLING MECHANISM FOR TURRET LATHES.
APPLICATION FILED OCT. 19, 1904.
2 SHEETS—SHEET 2.
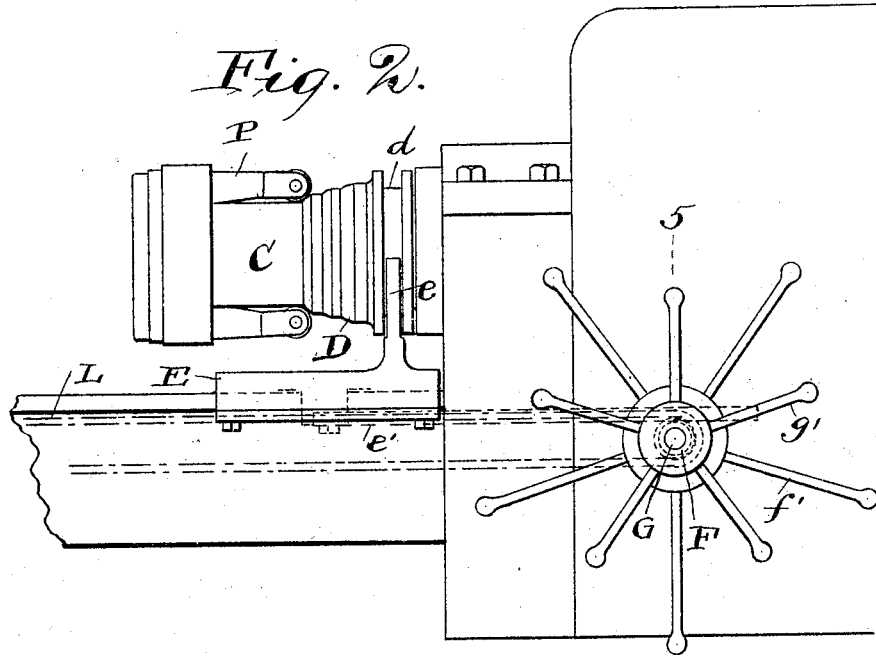
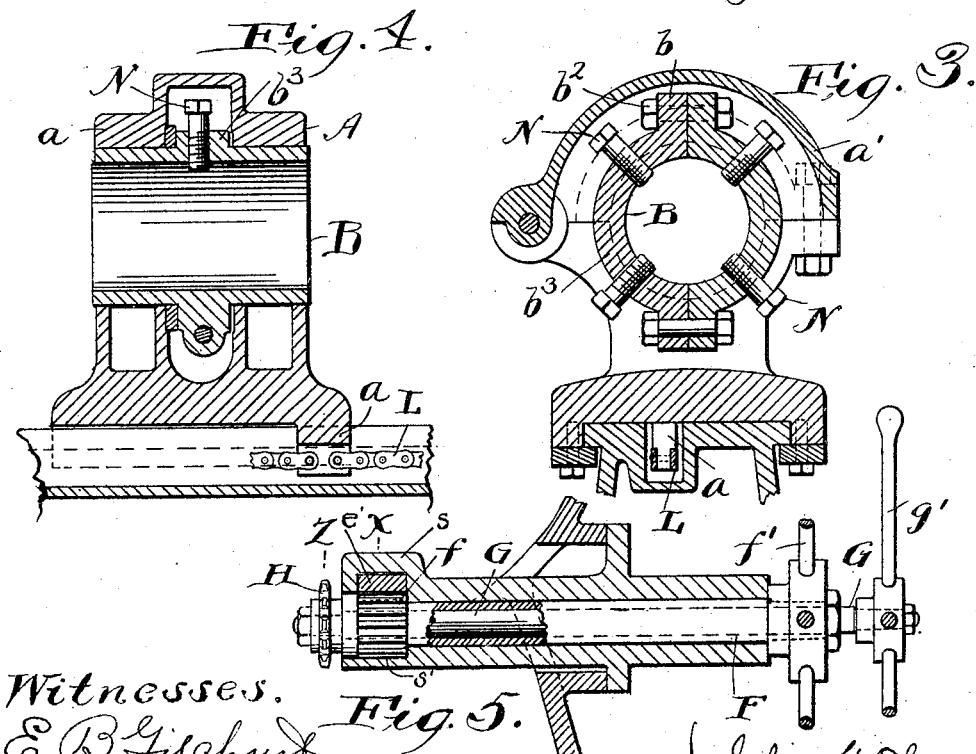

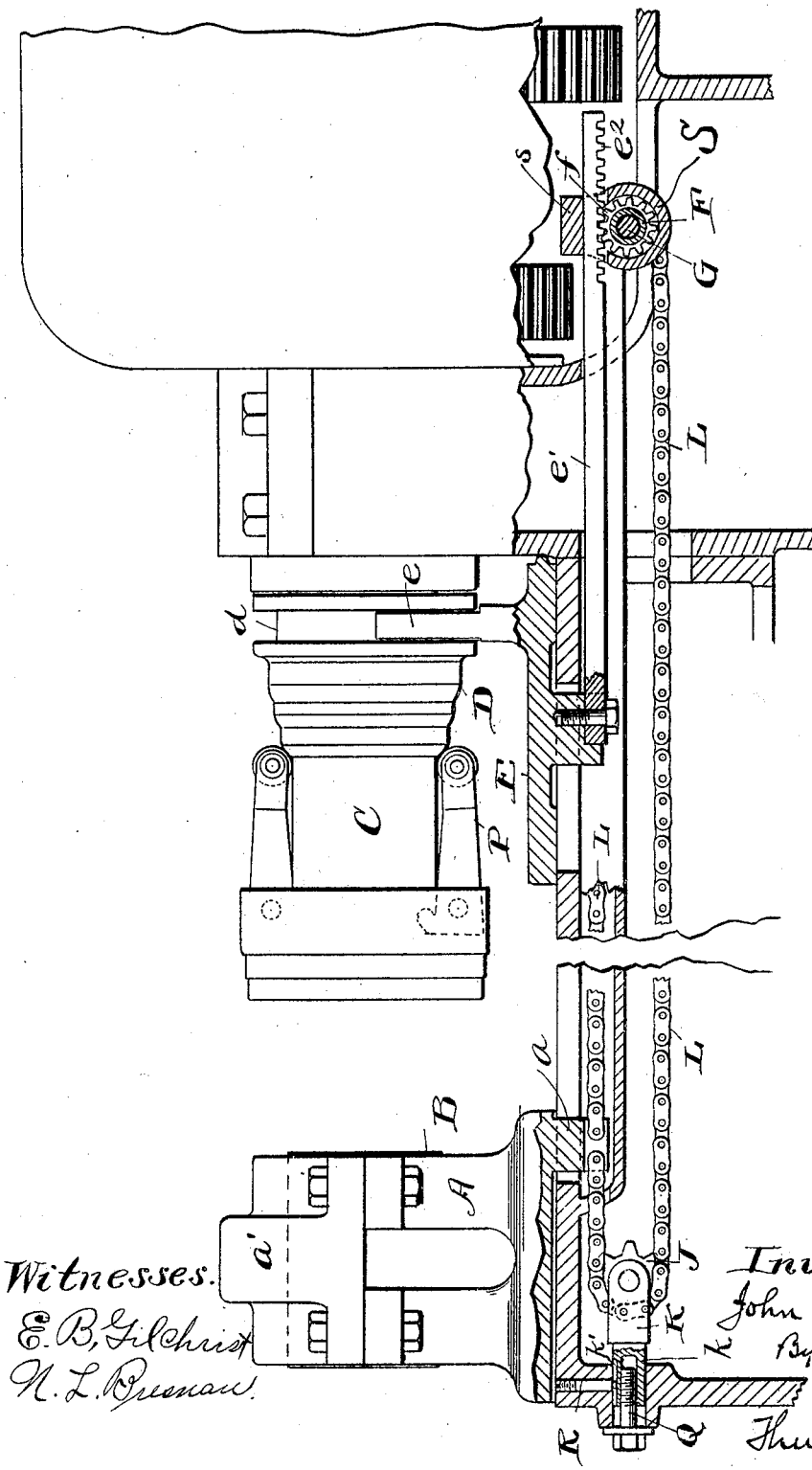

UNITED STATES PATENT OFFICE.

JOHN G. OLIVER, OF CLEVELAND, OHIO.

STOCK-HANDLING MECHANISM FOR TURRET-LATHES.

No. 803,243.       Specification of Letters Patent.       Patented Oct. 31, 1905.

Application filed October 19, 1904. Serial No. 229,109.

*To all whom it may concern:*

Be it known that I, JOHN G. OLIVER, a citizen of the United States, residing at Cleveland, in the county of Cuyahoga and State of Ohio, have invented a certain new and useful Improvement in Stock-Handling Mechanism for Turret-Lathes, of which the following is a full, clear, and exact description, reference being had to the accompanying drawings.

This invention is an improvement for lathes which have a tubular live-spindle carrying a chuck which grasps the stock passing through the spindle.

The invention relates to the means for feeding the stock-rod forward whenever necessary and for opening and closing the chuck.

One object of the invention is to provide such mechanism in a form which will permit the shortening of the projecting rear end of the spindle.

Another object is to provide mechanism in a simple form which may be very easily and conveniently operated. One familiar form of mechanism of this general character includes a slide and the mechanism for moving it backward and forward, a cone movable upon the spindle and operated by the slide for closing the chuck-jaws and permitting them to open, and means also operated by the slide for moving the stock forward, which latter mechanism does not become operative until the chuck is opened. It is therefore necessary that that part of the spindle which carries the cone shall be long enough to permit a considerable movement of the cone backward and forward on the spindle while the chuck is open. With my invention the rear end of the spindle need only be long enough for those movements of the cone which are required to open and close the chuck.

The invention may be summarized as the construction and combination of parts hereinafter described, and pointed out definitely in the claims.

In the drawings, Figure 1 is a front elevation, partly in vertical section, of so much of a turret-lathe as includes the present invention—that is to say, which shows the rear end of the spindle and the parts associated therewith having to do with the feeding of the stock and the opening and closing of the chuck-jaws. The lower part of this figure is in vertical longitudinal section, and the section at the right side of the figure is in the plane corresponding with the line X of Fig. 5, while the section at the left side of the figure is in the plane corresponding with the line Z of Fig. 5. Fig. 2 is a front elevation of the rear end of the spindle and the parts immediately adjacent thereto. Fig. 3 is a transverse vertical section of the slide A and the parts associated therewith. Fig. 4 is a longitudinal vertical section of the same parts, and Fig. 5 is a transverse vertical section in the plane indicated by line 5 of Fig. 2.

Referring to the parts by letters, A represents a slide which is movable in a guided longitudinal path on an auxiliary bed extending from the rear end of the head. In it is mounted a rotatable clamp B, which is intended to embrace and clamp the stock-rod, this clamp being rotatable in slide A about an axis coincident with the axis of the spindle C. This spindle carries a suitable chuck and chuck-operating mechanism. The levers forming a part of the chuck-operating mechanism are indicated by P. The cone D, which slides upon the spindle C, is intended to swing said levers outward, and thereby close the chuck, or to allow said levers to swing inward toward the axis and permit the chuck to open. A slide E, which is movable in a guided path below the spindle, carries a fork $e$, which engages in the annular groove $d$ in the cone. A bar $e'$, having rack-teeth $e^2$, is secured to this slide, and the rack-teeth thereon engage with a pinion $f$ upon a hollow shaft F, suitably mounted in the machine-frame. It will be noticed, particularly in Figs. 1 and 2, that when the cone D has been moved to the right free of the levers P there is and can be no further movement in that direction, the mechanism shown being in this respect different from any prior construction of a corresponding nature with which I am acquainted. In all other constructions there is quite a long piece of the spindle projecting beyond the head O, upon which this cone may slide after it is free of the levers.

A shaft G passes through and is mounted in the shaft F. A sprocket-wheel H is operated by this shaft and may be attached to it, as shown in Fig. 5. On the front ends of the two shafts F and G are attached the operating-handles $f'$ and $g'$, by which either shaft may be turned at will. A sprocket-wheel J is mounted in a yoke K, which is adjustably secured to the left end of the machine-frame. This yoke, as shown, has a rearwardly-extending hollow and internallythreaded shank $k$, which is slidably mounted in the machine-frame, and it receives the threaded part of a bolt Q, whose head bears against the outer edge of the machine-frame. A sprocket-chain L runs over the sprocket-wheels J and H, and this chain may be tightened or loosened by turning the bolt Q. The rotation of this shank $k$ may be prevented by a screw R, which screws down through the machine-bed and into the longitudinal groove $k'$ in said shank.

The hollow shaft F is mounted within a housing S, said housing closely surrounding and forming a bearing for said shaft. At the rear end of said housing there is provided an upwardly-extending enlargement $s$ above the pinion $f$. Immediately below said enlargement the housing is recessed, as shown at $s'$, to receive the pinion. The enlargement is provided with a slot therethrough above the pinion for the reception of the rack-bar $e'$. It will be apparent from the above construction that the housing not only forms a bearing for the hollow shaft F, but also provides means for inclosing and protecting the pinion $f$ and for preventing the rack from disengagement with said pinion.

The sprocket-chain is attached to a downwardly-projecting lug $a$ on the slide A. The slide A, as shown, is made with a hinged cap $a'$, which serves as the upper part of the bearing for the rotatable bushing B. This bushing is in the form of a longitudinally-split sleeve the halves of which are held together by bolts $b^2$ passing through flanges $b$, which project out from the flange $b^3$, which is centrally placed on such sleeve. This annular flange projects into an annular recess in the bearing therefor, and thereby endwise movement of the sleeve in said slide is impossible. It is the parts of this sleeve on opposite sides of this flange $b^3$ which are rotatably mounted in slide A. By swinging back the cap $a'$ and taking out one half of the sleeve B the stock may be placed in said clamp, or it can be run through from the rear end. By replacing the parts mentioned and adjusting the set-screws N the stock will be centered and clamped.

When it is desired to feed the stock forward in the spindle, the operator first turns the shaft F to move the cone D in the chuck-opening direction. This being accomplished, a very slight movement of the operator's hands enables him to take hold of the shaft G, which is to be turned as much as may be necessary, the result being the movement of the sprocket-chain and the corresponding movement of the slide A, whereby the stock will be moved forward through the spindle as far as desired. Then by turning the shaft F the stock will be clamped.

Having described my invention, I claim—

1. In a lathe, a frame supporting a tubular live-spindle carrying a chuck, chuck-operating levers on said spindle, a sliding cone for controlling the chuck-levers, a reciprocating rack-bar connected with the cone for operating the latter, a stock-carrying clamp in line with the spindle, means independent of the spindle movement for reciprocating said clamp and consisting of a chain, a hollow shaft supported by the frame carrying a hand-wheel at one end and a pinion at the other end meshing with the rack-bar, a second shaft passing through and having its bearings in said hollow shaft and carrying a hand-wheel at one end and a gear-wheel at the opposite end over which passes the chain from the stock-carrying clamp.

2. In a lathe having a tubular live-spindle carrying a chuck, the combination of levers for operating the chuck, a movable cone on the spindle for operating said levers, a slide for operating said cone, a second slide, a rotatable stock-clamp mounted therein, a hollow shaft having at one end an operating device and at the other end a pinion, a second shaft rotatably mounted within and extending through the hollow shaft and having an operating device at one end adjacent to the operating device of the hollow shaft and having at its other end operating means for the stock-clamp slide, a housing closely surrounding the hollow shaft and having adjacent the pinion therein a slotted enlargement, and a rack-bar connected to the cone-slide and extending through such slotted enlargement.

In testimony whereof I hereunto affix my signature in the presence of two witnesses.

JOHN G. OLIVER.

Witnesses:
    E. B. GILCHRIST,
    E. L. THURSTON.